Patented Feb. 11, 1930

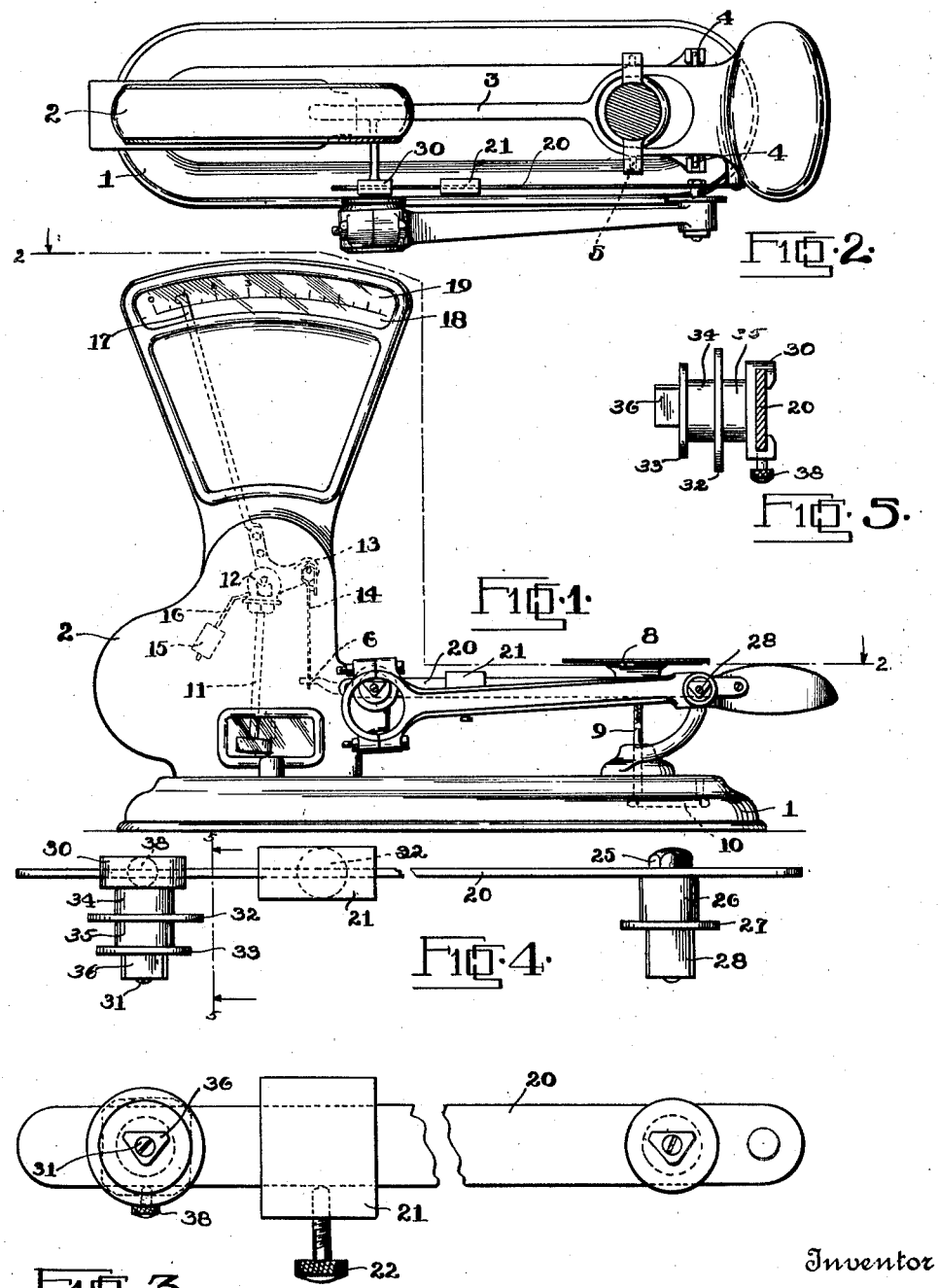

1,746,352

UNITED STATES PATENT OFFICE

HALVOR O. HEM, OF TOLEDO, OHIO, ASSIGNOR TO TOLEDO SCALE COMPANY, OF TOLEDO, OHIO, A CORPORATION OF NEW JERSEY

TESTING MACHINE

Application filed February 25, 1920. Serial No. 361,256.

This invention relates to testing devices, and particularly to devices for determing the weights and locating the centers of mass of machine parts, such as engine connecting rods. In order that high speed machines, such as internal combustion engines, may operate without undue vibration, it is necessary that the reciprocating as well as the rotating parts be properly balanced. In the case of a multi-cylinder engine, for example, the pistons and connecting rods which are operatively connected to the crank shaft should be of the same weight, as a variation of one ounce in the weight of the rods in an engine having a stroke of five inches results in an unbalanced centrifugal force amounting, at 1000 R. P. M., to approximately four pounds and seven ounces. It is also important that the centers of mass of the connecting rods be uniformly located with respect to the wrist pins and crank pins, since the connecting rods partake of both rotary and reciprocatory motion. The principal object of this invention is the provision of an instrument which will automatically indicate the weight of a machine part and also automatically show any aberration of the center of mass and indicate its extent. While I have shown the invention as embodied in a machine for testing engine connecting rods, it is to be understood that it is also adapted for embodiment in apparatus for testing other machine parts and that I contemplate its use wherever applicable.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a side elevation of an instrument embodying my invention, showing an engine connecting rod in position to be tested;

Figure 2 is a plan view of the same, the platform being shown in section on the line 2—2 of Figure 1;

Figure 3 is an enlarged elevation of a beam having connecting rod supports thereon, part of the beam being broken away;

Figure 4 is a plan view of the same; and

Figure 5 is a view in section on the line 5—5 of Figure 4.

The structure of the specific embodiment illustrated which adapts it for determining the total weight of machine parts is similar to that of a weighing scale of well-known type. It comprises an oblong base 1 which supports at one end an upright housing 2 containing the automatic load-offsetting and indicating mechanisms of the scale and at its other end a base horn which serves as a fulcrum stand for the platform supporting lever 3. The lever 3 is of the second class, having its fulcrum pivots 4 adjacent one end, intermediate load pivots 5 and a nose pivot 6 at its opposite end. A counterweight formed upon the lever projects beyond its fulcrum pivots and counterbalances the weight of the lever and parts attached thereto. A platform 8 is supported in the usual manner upon the load pivots 5, and a stem 9 rigid with the platform extends downwardly into the base where it is pivoted to a check link 10 which permits the platform to move upwardly and downwardly with the lever 3 and at the same time prevents its tilting.

The automatic load-offsetting mechanism comprises a pendulum 11 suspended from bearings 12, supported inside the housing 2, and having a power arm 13 projecting from its center to a point above the nose pivot 6 of the lever 3, with which it is connected by means of a link 14. A small sealing weight 15 is mounted upon a bendable rod 16 secured to the pendulum center so that its position may be adjusted to assist in properly balancing the scale.

An indicator hand 17 is rigidly secured to the pendulum center and projects upwardly therefrom, its upper end being visible through an arcuate window 18 which also displays a suitably graduated chart 19 in the upper end of the housing 2.

When a machine part or other load is placed upon the platform 8 the lever 3 is depressed, pulling the link 14 downwardly and elevating the pendulum to a point at which the load on the platform is counterbalanced. The indicator hand 17 swings over the chart 19 and comes to rest adjacent a graduation which shows in pounds and ounces the weight of a load on the platform. The lever 3 also carries a graduated beam 20 upon which is mounted a sliding poise 21 provided with a set screw 22 so that it may be locked in any desired position. When the beam and poise are not in use the poise is carried at the end of the beam farthest from the fulcrum of the lever 3, and when the poise is in this position the lever 3, with the counterpoise and other parts carried thereby, is nearly balanced on its fulcrum pivot and there is very little pull on the link 14. When it is desired to weigh a load beyond the capacity of the chart, or to neutralize tare, the poise is slid toward the lever fulcrum.

Carried upon the beam 20 with its axis in alignment with the fulcrum pivot of the lever 3 is a support adapted to receive either end of a connecting rod. This support comprises a bolt 25 projecting horizontally from the beam 20 upon which are fixed a cylindrical spacing member 26, a circular plate 27 and a block 28 having substantially the shape of a trigonal prism. For the purpose of supporting the other end of the connecting rod the beam 20 is equipped with a shiftable supporting member comprising a slide 30 from which projects a pin or bolt 31 carrying discs 32 and 33, spacing cylinders 34 and 35, and a prismatic supporting block 36. After the slide has been properly positioned upon the beam to test connecting rods of any particular length, it may be locked in place by means of a set screw 38.

There are several methods which may be followed in selecting connecting rods for an engine. According to one of these methods the rods are first divided into groups of uniform weight. The poise 21 is then locked in such position that the indicator hand will stand within the limits of the chart when a connecting rod is placed upon the supporting blocks 28 and 36. Each connecting rod in the group is then placed upon the supporting blocks. If the centers of mass are uniformly located on the longitudinal axes of the rods there will be no variation in the position taken by the indicator hand. If, however, the centers of mass are not uniformly located, those in which the centers are located at the greater distance from the blocks 28 will cause the hand 17 to indicate the higher values on the chart. The connecting rods may then be marked or subdivided into sets according to the positions of the centers of mass, and those in which the displacement is such that they do not conveniently fall into any set are laid aside to be machined or ground to proper proportions.

The shape of the blocks 28 and 36 may be varied, if desired, and a connecting rod may be tested according to the method outlined above by hanging either end on the block 28. Since, however, the crank shaft end of the connecting rod is the heavier, it is preferable to place that end on the block 36.

It is preferable to use connecting rod supports of the prismatic shape shown, for the reason that when the small end of the rod is passing over one of the supports, it is as effectively positioned as it would be if the support were cylindrical in shape and snugly fitted the opening in the small end of the rod. A cylindrical support would, however, be apt to stick in the opening and therefore render the rod difficult to remove. When prismatic supports are used, the inner surface of the opening contacts only with the three somewhat rounded edges of the prism and the liability of the rod's sticking is therefore reduced to a minimum.

For extremely accurate work the connecting rod may first be tested with the heavy end on the block 36 nearest the nose of the lever and then turned end for end. The slightest excess or deficiency in the weight of either end will appear on the chart. When this procedure is followed the connecting rods need not be first weighed. Those which are too light at either end may be rejected and those which are too heavy at either end machined down. If the poise 22 be shifted on the beam 20 to a point at which a perfectly proportioned connecting rod will, if hung in the position shown in Figure 1, bring the indicator hand to an even pound mark near the capacity side of the chart, it will, if reversed, move the hand several ounce graduations away from zero. The total amount of metal to be removed from an overweight rod will then be proportional to the sum of the overweights of the ends, and the distance from the fulcrum at which the metal should be removed can be determined by multiplying the overweight of the other end by the length of the rod and dividing the product by the total overweight.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, automatic weighing and indicating mechanism, and means for so supporting similar connecting rods upon said weighing mechanism that variations in the locations of their centers of mass result in variations in the operation of said indicating mechanism.

2. In a device of the class described, in combination, a beam, a plurality of longitudinally-spaced supports on said beam adapted to act together to so support an article that the balance of said beam is affected by the location of the center of mass of said article, each of said supports supporting a part of the weight of said article, and means for automatically indicating the condition of balance of said beam.

3. In a device of the class described, in combination, a beam, a slidable poise on said beam, a plurality of longitudinally-spaced supports on said beam adapted to act together to so support an article that the balance of said beam is affected by the location of the center of mass of said article, each of said supports supporting a part of the weight of said article, and means for automatically indicating the condition of balance of said beam.

4. In a device of the class described, in combination, a beam, a support on said beam in alignment with the fulcrum thereof, and a second support on said beam spaced from said fulcrum whereby when an article is placed upon said supports the balance of said beam is affected by the position of the center of mass of said article.

5. In a device of the class described, in combination, a beam, a slidable poise on said beam, a support on said beam in alignment with the fulcrum thereof, and a second support on said beam spaced from said fulcrum whereby when an article is placed upon said supports the balance of said beam is affected by the position of the center of mass of said article.

6. In a device of the class described, in combination, a beam, a support on said beam in alignment with the fulcrum thereof, a second support on said beam spaced from said fulcrum whereby when an article is placed upon said supports the balance of said beam is affected by the position of the center of mass of said article, and means for automatically indicating the condition of balance of said beam.

7. In a device of the class described, in combination, a beam, a slidable poise on said beam, a support on said beam in alignment with the fulcrum thereof, a second support on said beam spaced from said fulcrum whereby when an article is placed upon said supports the balance of said beam is affected by the position of the center of mass of said article, and means for automatically indicating the condition of balance of said beam.

8. In a device of the class described, in combination, a beam, a support on said beam in alignment with the fulcrum thereof, and a second support on said beam adjustably spaced from said fulcrum whereby when an article is placed upon said supports the balance of said beam is affected by the position of the center of mass of said article.

9. In a device of the class described, in combination, a beam, a slidable poise on said beam, a support on said beam in alignment with the fulcrum thereof, and a second support on said beam adjustably spaced from said fulcrum whereby when an article is placed upon said supports the balance of said beam is affected by the position of the center of mass of said article.

10. In a device of the class described, in combination, a beam, a support on said beam in alignment with the fulcrum thereof, a second support on said beam adjustably spaced from said fulcrum whereby when an article is placed upon said supports the balance of said beam is affected by the position of the center of mass of said article, and means for automatically indicating the condition of balance of said beam.

11. In a device of the class described, in combination, automatic weighing and indicating mechanism, and means for so connecting a connecting rod to said weighing mechanism that the condition of balance of said weighing mechanism is affected by the position of the center of mass of said article.

12. In a device of the class described, in combination, automatic weighing and indicating mechanism, and means for reversibly connecting a connecting rod to said weighing mechanism so that the condition of balance of said weighing mechanism is affected by the position of the center of mass of said article.

13. In a device of the class described, in combination, a lever, a beam secured thereto, a support fixed to said beam substantially in alignment with the fulcrum of said lever, an adjustable support on said beam, automatic load-offsetting mechanism, and a connection from said lever to said automatic load-offsetting mechanism.

14. In a device of the class described, in combination, a lever, a beam secured thereto, a slidable poise on said beam, a support fixed to said beam substantially in alignment with the fulcrum of said lever, an adjustable support on said beam, automatic load-offsetting mechanism, and a connection from said lever to said automatic load-offsetting mechanism.

15. In a device of the class described, in combination, a lever, means for fixedly positioning a connecting rod to be tested with respect to said lever whereby the effect of the weight of such article varies with the position of its center of mass, and automatic load-offsetting mechanism connected to said lever.

16. In a device of the class described, in combination, a lever, and a plurality of spaced horizontally-projecting supports secured thereto, one of said supports having its axis in alignment with the fulcrum of said lever.

17. In a device of the class described, in combination, a lever, and a plurality of spaced horizontally-projecting supports secured thereto, one of said supports having its axis in alignment with the fulcrum of said lever and the other support being adjustably mounted.

18. In a device of the class described, in combination, a lever, a plurality of spaced horizontally-projecting supports secured thereto, one of said supports having its axis in alignment with the fulcrum of said lever and the other support being adjustably mounted, and automatic-load-offsetting mechanism connected to said lever.

19. In a device of the class described, in combination, a lever, a plurality of spaced horizontally-projecting prismatic supports secured thereto, one of said supports having its axis in alignment with the fulcrum of said lever.

20. In a device of the class described, in combination, a lever, and a plurality of spaced horizontally-projecting prismatic supports secured thereto, one of said supports having its axis in alignment with the fulcrum of said lever and the other support being adjustably mounted.

21. In a device of the class described, in combination, a lever, a plurality of spaced horizontally-projecting prismatic supports secured thereto, one of said supports having its axis in alignment with the fulcrum of said lever and the other support being adjustably mounted, and automatic load-offsetting mechanism connected to said lever.

22. In a device of the class described, means for positioning an apertured article on a scale beam, comprising a prismatic projection adapted to engage the aperture of such article.

23. In a device of the class described, means for supporting a connecting rod upon a scale beam, comprising a pair of supports, each having portions of proper dimensions to fit both the wrist pin and the crank pin aperture of such connecting rod.

HALVOR O. HEM.